United States Patent
Momose

(10) Patent No.: US 10,781,051 B2
(45) Date of Patent: Sep. 22, 2020

(54) CONVEYANCE MECHANISM, MEDIUM PROCESSING DEVICE COMPRISING CONVEYANCE MECHANISM, AND CONVEYANCE METHOD

(71) Applicant: NIDEC SANKYO CORPORATION, Nagano (JP)

(72) Inventor: Munemasa Momose, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/635,551

(22) PCT Filed: Jul. 12, 2018

(86) PCT No.: PCT/JP2018/026323
§ 371 (c)(1),
(2) Date: Jan. 31, 2020

(87) PCT Pub. No.: WO2019/026585
PCT Pub. Date: Feb. 7, 2019

(65) Prior Publication Data
US 2020/0165070 A1    May 28, 2020

(30) Foreign Application Priority Data
Jul. 31, 2017 (JP) .................. 2017-147640

(51) Int. Cl.
*B65G 43/08* (2006.01)
*G06K 13/067* (2006.01)
(Continued)

(52) U.S. Cl.
CPC ............ *B65G 43/08* (2013.01); *B65G 13/07* (2013.01); *B65H 5/062* (2013.01); *G06K 13/067* (2013.01); *G06K 13/07* (2013.01)

(58) Field of Classification Search
CPC ...... G06K 13/067; G06K 13/07; B65G 43/08; B65G 13/12; B65G 13/04; B65G 13/065;
(Continued)

(56) References Cited

U.S. PATENT DOCUMENTS

| 5,664,771 A * | 9/1997 | Nagatani | B65H 3/0669 271/10.03 |
| 7,392,980 B2 * | 7/2008 | Takeuchi | B65H 3/5261 271/10.01 |

(Continued)

FOREIGN PATENT DOCUMENTS

| JP | H0817131 | 1/1996 |
| JP | H09322389 | 12/1997 |

(Continued)

OTHER PUBLICATIONS

"International Search Report (Form PCT/ISA/210) of PCT/JP2018/026323," dated Aug. 21, 2018, with English translation thereof, pp. 1-2.

*Primary Examiner* — Mark A Deuble
(74) *Attorney, Agent, or Firm* — JCIPRNET

(57) ABSTRACT

A conveyance mechanism capable of attaining high conveyance performance and protecting a conveyance object and a mechanism itself, a medium processing device and a conveyance method using the conveyance mechanism are provided to solve the problem. The conveyance mechanism includes a conveyance passage which is a passage where a conveyance object is conveyed, a conveyance member moving the conveyance object along the conveyance passage, a motor driving the conveyance member, a control part controlling an output torque of the motor, a conveyance state identifying means identifying a conveyance state that is a position and/or a conveyance direction of the conveyance object in the conveyance passage, and a storage part which upper limit torque information which is an upper limit value (Continued)

of an output torque allowable for the motor or a parameter value required for calculation of the upper limit value is registered for each type of the conveyance state.

20 Claims, 6 Drawing Sheets

(51) Int. Cl.
    *G06K 13/07*     (2006.01)
    *B65H 5/06*     (2006.01)
    *B65G 13/07*     (2006.01)

(58) Field of Classification Search
    CPC .... B65G 13/07; B65G 13/071; B65G 13/067; B65H 5/06; B65H 5/068; B65H 5/062
    USPC ........................................................ 198/624
    See application file for complete search history.

(56) References Cited

U.S. PATENT DOCUMENTS

| | | | |
|---|---|---|---|
| 7,971,878 B2* | 7/2011 | Hashimoto | G03G 15/0131 198/624 |
| 2010/0116623 A1* | 5/2010 | Du | B65G 39/02 198/624 |
| 2013/0241144 A1* | 9/2013 | Yasukawa | B65H 3/5261 271/272 |
| 2018/0232609 A1* | 8/2018 | Miyazawa | G06K 13/06 |
| 2019/0384945 A1* | 12/2019 | Momose | G06K 7/0091 |

FOREIGN PATENT DOCUMENTS

| | | |
|---|---|---|
| JP | H10326325 | 12/1998 |
| JP | 2014078149 | 5/2014 |

* cited by examiner

CONVEYANCE MECHANISM, MEDIUM PROCESSING DEVICE COMPRISING CONVEYANCE MECHANISM, AND CONVEYANCE METHOD

CROSS-REFERENCE TO RELATED APPLICATION

This application is a 371 application of the International PCT application Ser. No. PCT/JP2018/026323, filed on Jul. 12, 2018, which claims the priority benefit of Japan Patent Application No. 2017-147640, filed Jul. 31, 2017. The entirety of each of the above-mentioned patent application is hereby incorporated by reference herein and made a part of this specification.

BACKGROUND

Technical Field

The present invention relates to a technique for preventing damage of a conveyance mechanism and a conveyance object.

Description of Related Art

In Patent Literature 1 (Japanese Patent Application Laid-Open No. Hei 8-17131), a card processing device is disclosed in which a card is conveyed by a roller.

[Patent Literature 1] Japanese Patent Application Laid-Open No. Hei 8-17131

SUMMARY

In the card processing device described in Patent Literature 1, a card is conveyed by being sandwiched and sent out by rollers. In such a mechanism in which a force is applied to a conveyance object by a conveyance member such as a roller for conveyance, for protection of the conveyance object and the mechanism itself, a motor is used which has an output to the extent that the conveyance operation is stopped when a conveyance abnormality such as clogging of the conveyance object has occurred.

On the other hand, in a case that a motor having a high output is used in a conveyance mechanism in order to increase a processing speed, tooth skipping in a gear part included in a power transmission member or slip between a conveyance member and a conveyance object may occur due to a conveyance abnormality to cause a damage of the conveyance mechanism or the conveyance object. In order to prevent this problem, it is conceivable that an upper limit torque is set in the motor so as not to occur tooth skipping and slip even when a conveyance abnormality has occurred. However, in a case that a conveyance member is disposed at a plurality of positions in a conveyance passage, a torque which occurs tooth skipping and slip becomes different depending on a position and a conveyance direction of a conveyance object on the conveyance passage and, in addition, the condition is dependent on a structure of the conveyance mechanism.

In view of the problem described above, an objective of the present invention is to provide a conveyance mechanism which is capable of attaining high conveyance performance and protecting a conveyance object and a mechanism itself, and a medium processing device using the conveyance mechanism, and a conveyance method.

To solve the above-mentioned problem, a conveyance mechanism in accordance with the present invention includes a conveyance passage which is a passage where a conveyance object is conveyed, a conveyance member which moves the conveyance object along the conveyance passage, a motor which drives the conveyance member, a control part which controls an output torque of the motor, a conveyance state identifying means which identifies a conveyance state that is a position and/or a conveyance direction of the conveyance object in the conveyance passage, and a storage part in which upper limit torque information which is an upper limit value of an output torque allowable for the motor or a parameter value required for calculation of the upper limit value is registered for each type of the conveyance state. The control part acquires the upper limit torque information corresponding to the conveyance state from the storage part based on the conveyance state identified by the conveyance state identifying means and dynamically switches the upper limit value of the output torque allowable for the motor.

The conveyance mechanism includes the storage part in which upper limit torque information is registered for each type of a conveyance state of a conveyance object, and the conveyance state identifying means which is capable of identifying the conveyance state of the conveyance object having been inserted and thus, the control part is capable of switching an upper limit torque of the motor according to a change of the conveyance state of the conveyance object. As a result, even in a case that a motor having a high output which continues to drive when a conveyance abnormality has occurred is used, both of a high conveying ability and protection of the conveyance mechanism and a conveyance object can be attained without limiting an upper limit value of an output torque to the minimum value in the entire mechanism.

Further, it is preferable that the control part is capable of estimating an output torque of the motor from a rotation number and a voltage value of the motor based on a torque characteristic of the motor, and the control part adjusts a voltage applied to the motor so as not to exceed the upper limit value of the output torque allowable for the motor.

The control part is capable of estimating an output torque of the motor based on the rotation number and the voltage value and, in addition, capable of controlling the voltage applied to the motor and thus, the control part is capable of controlling so that the output torque does not exceed the upper limit value while monitoring the output torque of the motor.

Further, it is preferable that the motor is a DC motor, the control part controls the voltage applied to the motor by a pulse-width modulation system, and the control part adjusts a duty ratio of the voltage applied to the motor so as not to exceed the upper limit value of the output torque allowable for the motor.

In a DC motor used in a general conveyance mechanism, it is conceivable that its rotation number is commonly controlled by a pulse-width modulation system. Therefore, when a duty ratio of a voltage applied to a DC motor is controlled to limit an output torque of the motor, a protection function in the present invention can be efficiently mounted by utilizing an existing conveyance mechanism.

Further, it is preferable that the conveyance state identifying means includes a detector structured to detect that the conveyance object has reached a predetermined position on the conveyance passage, and the detector is disposed at a plurality of positions on the conveyance passage.

For example, a conveyance state of a conveyance object can be also estimated by counting a rotation number of the motor or by measuring a time after the conveyance object is inserted. However, when a detector is disposed at a plurality of positions in the conveyance passage, an actual conveyance state of the conveyance object can be fed back and thus, the conveyance state of the conveyance object can be identified with a further high degree of accuracy.

Further, it is preferable that the conveyance member includes conveyance rollers which are a pair of rotation bodies structured to sandwich and send out the conveyance object, and the conveyance rollers are structured of a drive roller which is rotated by a drive force of the motor and a driven roller which is rotated following rotation of the drive roller or sliding of the conveyance object.

In a case that a conveyance member is adopted which is directly contacted with a conveyance object to apply a force like the conveyance roller in this structure, when a conveyance abnormality such as clogging of the conveyance object has occurred, the conveyance object may be damaged by a force of the conveyance member applied to the conveyance object. Especially, the conveyance roller in this structure is a mechanism structured to send out the conveyance object by a frictional force and thus, when slip has occurred, a scratch may be left on a surface of the conveyance object. On the other hand, in the conveyance mechanism in the present invention, an output torque of the motor is limited according to a conveyance state of a conveyance object and thus, even when a conveyance abnormality has occurred, slip of the conveyance roller can be prevented in advance. As a result, both sure transmission of a conveyance force to a conveyance object and protection of the conveyance object can be attained.

Further, it is preferable that the conveyance member comprises a plurality of sets of the conveyance rollers and a plurality of the drive rollers is driven by one piece of the motor.

In order to set an upper limit torque corresponding to a conveyance state of a conveyance object, for example, in a case that a dedicated motor is provided in each conveyance member, there are concerns that a size of the mechanism is increased according to the increase of the number of the motors, and power consumption, assembling steps and a manufacturing cost are increased. On the other hand, according to the conveyance mechanism in the present invention, an upper limit torque of the motor can be dynamically switched and thus, a plurality of the conveyance members can be controlled by one piece of the motor. As a result, minute control of torque corresponding to a conveyance state can be realized while suppressing the number of the motors being mounted.

Further, it is preferable that the conveyance mechanism further includes a power transmission member structured to transmit the drive force of the motor to the drive roller, and the power transmission member includes a toothed belt.

In a case that a toothed belt is adopted as a power transmission member of the conveyance mechanism, when synchronization of the respective power transmission members is impaired due to a conveyance abnormality such as clogging of a conveyance object, tension of the toothed belt is disturbed and tooth skipping may occur between the toothed belt and the engagement member. On the other hand, in the conveyance mechanism in the present invention, an upper limit torque of the motor is capable of being switched corresponding to a conveyance state of a conveyance object and thus, an operation of the conveyance member, i.e., an operation of the power transmission member can be stopped before tooth skipping occurs. As a result, mechanical restriction of the toothed belt in which tension is required to keep constant can be coped with.

Further, in order to solve the above-mentioned problem, a medium processing device in accordance with the present invention includes the conveyance mechanism in the present invention, the conveyance object is a card-shaped information recording medium, and the medium processing device further includes an information processing part which is capable of executing at least one of reading processing of information recorded in the information recording medium and writing processing of information to the information recording medium.

Since the medium processing device includes the conveyance mechanism in the present invention, even in a case that a motor having a high output which continues to drive when a conveyance abnormality has occurred is used, both of a high conveying ability and protection of the mechanism itself and an information recording medium can be attained without limiting an upper limit value of an output torque to the minimum value in the entire mechanism.

Further, it is preferable that the conveyance member moves the conveyance object at a constant speed.

When reading of information recorded in an information recording medium and writing of information to an information recording medium are to be performed, the information recording medium is required to be moved at a constant speed which is capable of processing in the information processing part.

Further, in order to solve the above-mentioned problem, a conveyance method in accordance with the present invention is a conveyance method which uses a conveyance mechanism including a conveyance passage which is a passage where a conveyance object is conveyed, a conveyance member which moves the conveyance object along the conveyance passage, a motor which drives the conveyance member, a conveyance state identifying means which identifies a conveyance state that is a position and/or a conveyance direction of the conveyance object in the conveyance passage, and a storage part in which upper limit torque information which is an upper limit value of an output torque allowable for the motor or a parameter value required for calculation of the upper limit value is registered for each type of the conveyance state. The conveyance method includes a conveyance state identifying step in which the conveyance state of the conveyance object is identified by the conveyance state identifying means, an upper limit torque information acquisition step in which the upper limit torque information corresponding to the conveyance state is acquired from the storage part, and an upper limit torque setting step in which the upper limit value of the output torque allowable for the motor is switched based on the upper limit torque information corresponding to the conveyance state.

Since the conveyance mechanism includes the storage part in which upper limit torque information is registered for each type of the conveyance state of an conveyance object, and the conveyance state identifying means which is capable of identifying the conveyance state of the conveyance object having been inserted and thus, an upper limit torque of the motor is capable of dynamically switching according to a change of the conveyance state of the conveyance object. As a result, even in a case that a motor having a high output which continues to drive when a conveyance abnormality has occurred is used, both of a high conveying ability and protection of the conveyance mechanism and a conveyance object can be attained without limiting an upper limit value of an output torque to the minimum value in the entire mechanism.

Further, it is preferable that the conveyance method in the present invention further includes an upper limit voltage calculation step in which an upper limit voltage capable of being applied to the motor is calculated from a rotation number of the motor based on a torque characteristic of the motor, and a torque adjustment step in which the voltage applied to the motor is adjusted so as not to exceed the upper limit value of the output torque.

An output torque of the motor can be estimated based on the rotation number and the voltage value and, in addition, a voltage applied to the motor can be controlled and thus, the output torque can be limited so as not to exceed the upper limit value while monitoring an output torque of the motor.

Further, it is preferable that the motor is a DC motor in which an applied voltage is controlled by a pulse-width modulation system, and a duty ratio of the applied voltage to the motor is adjusted in the torque adjustment step so as not to exceed the upper limit value of the output torque.

In a DC motor used in a general conveyance mechanism, it is conceivable that its rotation number is commonly controlled by a pulse-width modulation system. Therefore, when a duty ratio of a voltage applied to a DC motor is controlled to limit an output torque of the motor, a protection function in the present invention can be efficiently mounted by utilizing an existing conveyance mechanism.

Further, it is preferable that the conveyance member comprises a plurality of sets of conveyance rollers which are a pair of rotation bodies structured to sandwich and send out the conveyance object, each set of the conveyance rollers is structured of a drive roller which is rotated by a drive force of the motor and a driven roller which is rotated following rotation of the drive roller or sliding of the conveyance object, and a plurality of the drive rollers is driven by one piece of the motor.

In the conveyance method in the present invention, an output torque of the motor is limited according to a conveyance state of a conveyance object and thus, even when a conveyance abnormality has occurred, slip of the conveyance roller can be prevented in advance. Further, in the conveyance method in the present invention, an upper limit torque of the motor can be dynamically switched and thus, a plurality of the conveyance members can be controlled by one piece of the motor. As a result, minute control of an upper limit torque corresponding to a conveyance state can be realized while suppressing the number of the motors being mounted.

Further, it is preferable that the conveyance mechanism further includes a power transmission member structured to transmit the drive force of the motor to the drive roller, and the power transmission member includes a toothed belt.

In the conveyance method in the present invention, an upper limit torque of the motor is capable of being switched corresponding to a conveyance state of a conveyance object. Therefore, an operation of the conveyance member, i.e., an operation of the power transmission member can be stopped before tooth skipping occurs. As a result, mechanical restriction of the toothed belt in which tension is required to keep constant can be coped with.

Further, it is preferable that the conveyance object is a card-shaped information recording medium, and the conveyance method further includes an information processing step in which at least one of reading processing of information recorded in the information recording medium and writing processing of information to the information recording medium is executed.

When the conveyance method in the present invention is used, even in a case that a motor having a high output which continues to drive when a conveyance abnormality has occurred is used, both of high information processing performance and protection of an information recording medium can be attained without limiting an upper limit value of the output torque to the minimum value in the entire mechanism.

As described above, according to the conveyance mechanism in the present invention, and the medium processing device which uses the conveyance mechanism, and the conveyance method, both of high conveyance performance and protection of a conveyance object and the mechanism itself can be attained.

DESCRIPTION OF THE EMBODIMENTS

[Schematic Structure]

An embodiment of a conveyance mechanism, an information processing medium and a conveyance method in accordance with the present invention will be described below with reference to the accompanying drawings. A card reader in this embodiment is a medium processing device which is structured to perform reading of data recorded in a card which is an information recording medium and/or recording of data to a card and, for example, the card reader is assembled into a host apparatus, for example, an ATM (Automatic Teller Machine), cash dispenser, kiosk terminal, distribution POS (Point of sale system) terminal, entrance/exit management terminal, or various ID card terminals, which is structured to process information recorded in a card and used.

Further, a card used in this embodiment is made of vinyl chloride and is a rectangular card whose thickness is 0.7-0.8 mm. The card is incorporated with an IC chip in which electronic data are recorded, and a terminal of the IC chip is exposed on one face of the card. Further, a magnetic stripe in which magnetic data are recorded is stuck on the other face of the card. The card may be provided only one of the IC chip and the magnetic stripe.

(Functional Configuration)

Figure 1:
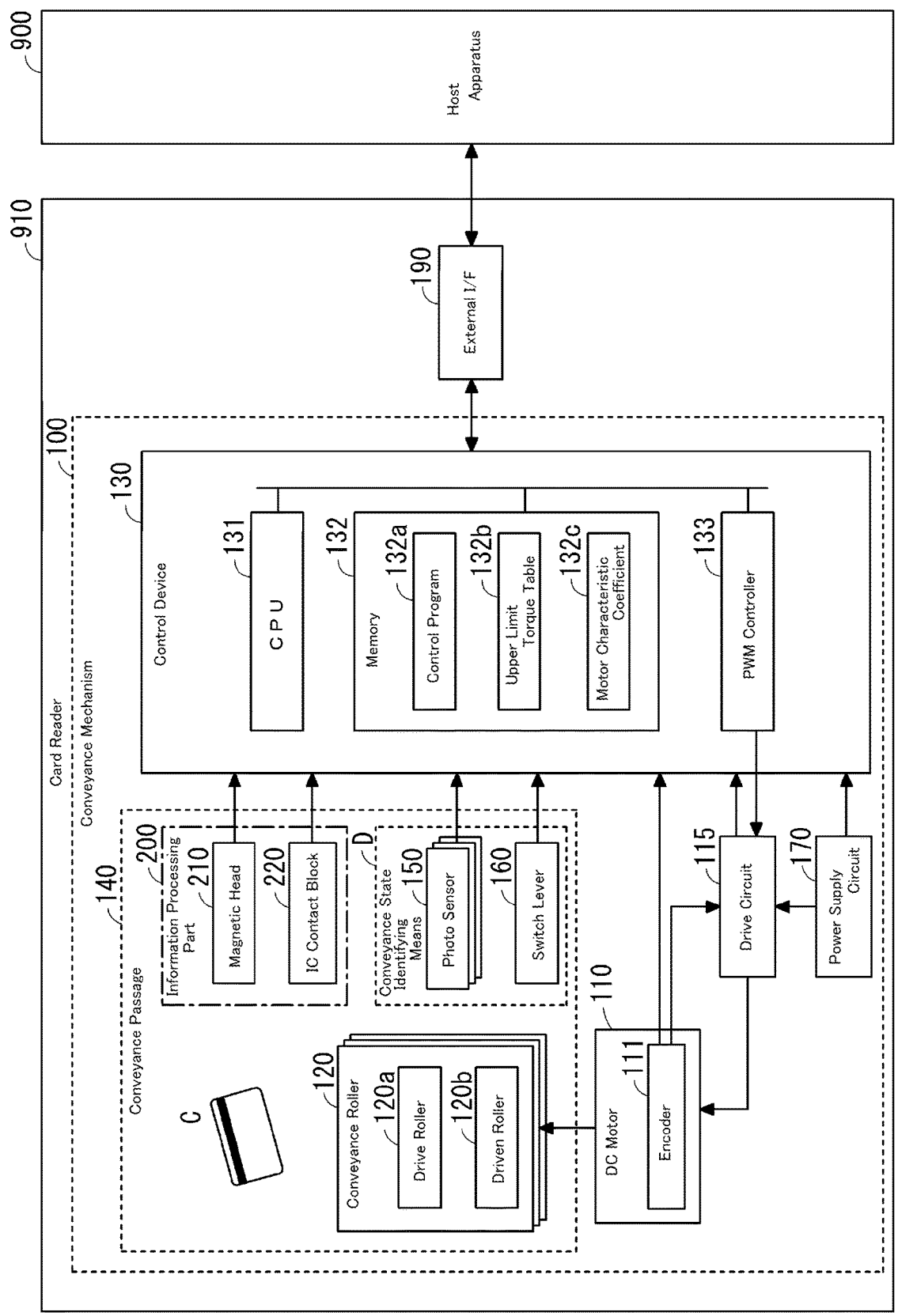
FIG. 1 is a block diagram showing a functional configuration of a card reader in accordance with an embodiment of the present invention.

FIG. 1 is a block diagram showing a functional configuration of a card reader 910. A function of the card reader 910 in this embodiment is mainly configured of a conveyance mechanism 100 structured to convey a card "C" which is a conveyance object, and an information processing part 200 configured to process information recorded in the card "C".

An external I/F (Interface) 190 of the card reader 910 is connected with a host apparatus 900, and the card reader 910 transmits and receives commands and data to and from the host apparatus 900. For connection of the card reader 910 with the host apparatus 900, for example, a USB (Universal Serial Bus) cable, a connection cable corresponding to so-called RS-232C or the like may be used.

The conveyance mechanism 100 uses a DC motor 110 (hereinafter, simply referred to a "motor 110") as a drive source, and operation of the motor 110 is managed by a control device 130 which is a control part of the card reader 910. An encoder 111 is mounted on the motor 110, and a pulse signal (encoder pulse) is fed back to a drive circuit 115 for the motor 110 and the control device 130. Further, electric power is supplied to the drive circuit 115 and the control device 130 from a power supply circuit 170, and the control device 130 always monitors a voltage value applied to the motor 110 by the power supply circuit 170 and the drive circuit 115.

The control device 130 in this embodiment is configured of a general micro controller, FPGA, CPLD or a logical circuit. The control device 130 includes a CPU 131 which is a central processing unit, a memory 132 which is a storage device such as a ROM, RAM and flash memory, and a PWM (Pulse Width Modulation) controller 133 which controls a rotation number of the motor 110 through the drive circuit 115. In this case, the PWM controller 133 may be included in the CPU, FPGA or CPLD. The memory 132 is a storage part in the present invention. The memory 132 is loaded with a control program 132a which is a program for controlling operation of the entire card reader 910 such as monitoring and driving of the conveyance mechanism 100 and signal processing of a card "C". Further, the memory 132 includes a motor characteristic coefficient 132c which is a value indicating a torque characteristic on specifications of the DC motor 110, and an upper limit torque table 132b in which upper limit torque information "L" described below has been registered.

The conveyance passage 140 which is a passage where a card "C" is conveyed is provided with three sets of conveyance rollers 120, four photo sensors 150, a lever switch 160 and an information processing part 200.

The conveyance roller 120 is a conveyance member which moves a card "C" forward and rearward along the conveyance passage 140. Each set of the conveyance rollers 120 is a pair of rotation bodies for sandwiching and sending a card "C" out and is structured of a drive roller 120a rotated by a drive force of the motor 110 and a driven roller 120b which is rotated following rotation of the drive roller 120a or sliding of the card "C".

The photo sensors 150 and the lever switch 160 structure a conveyance state identifying means "D" for specifying a conveyance state "S" which is a position and a conveyance direction of a card "C" in the conveyance passage 140 together with the control program 132a. The photo sensor 150 and the lever switch 160 are detectors which detect that a card "C" has reached a predetermined position on the conveyance passage 140.

The information processing part 200 executes at least one of reading processing of information recorded in a card "C" and writing processing of information to a card "C" together with the control program 132a. The information processing part 200 in this embodiment includes a magnetic head 210 and an IC contact block 220. The magnetic head 210 performs reading and writing of magnetic data by contacting and sliding on a magnetic stripe of a card "C". The IC contact block 220 is structured to contact with an IC chip terminal of a card "C" to perform reading and writing of electronic data.

Figure 2:
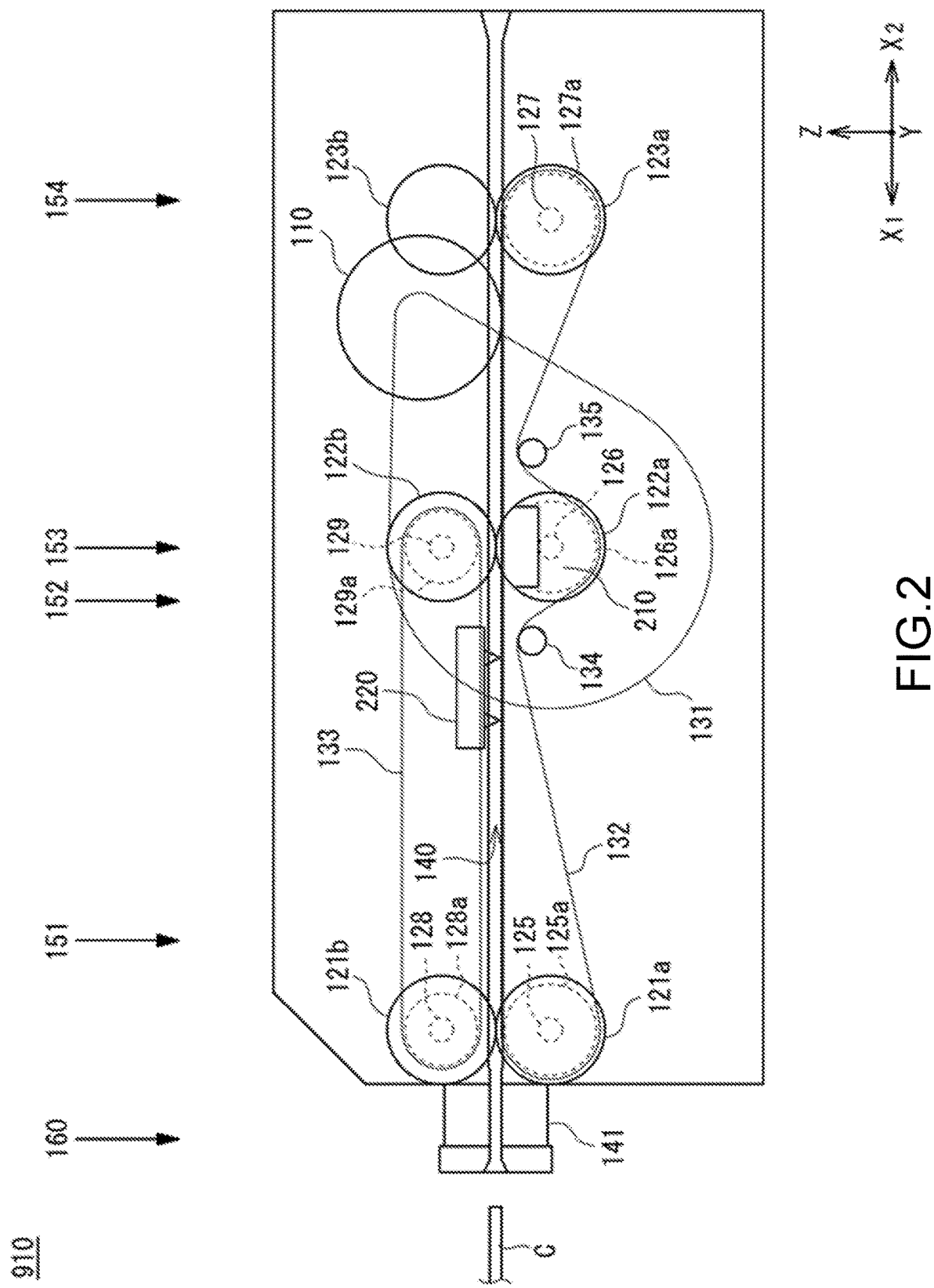
FIG. 2 is a cross-sectional side view showing a card reader.
Figure 3:
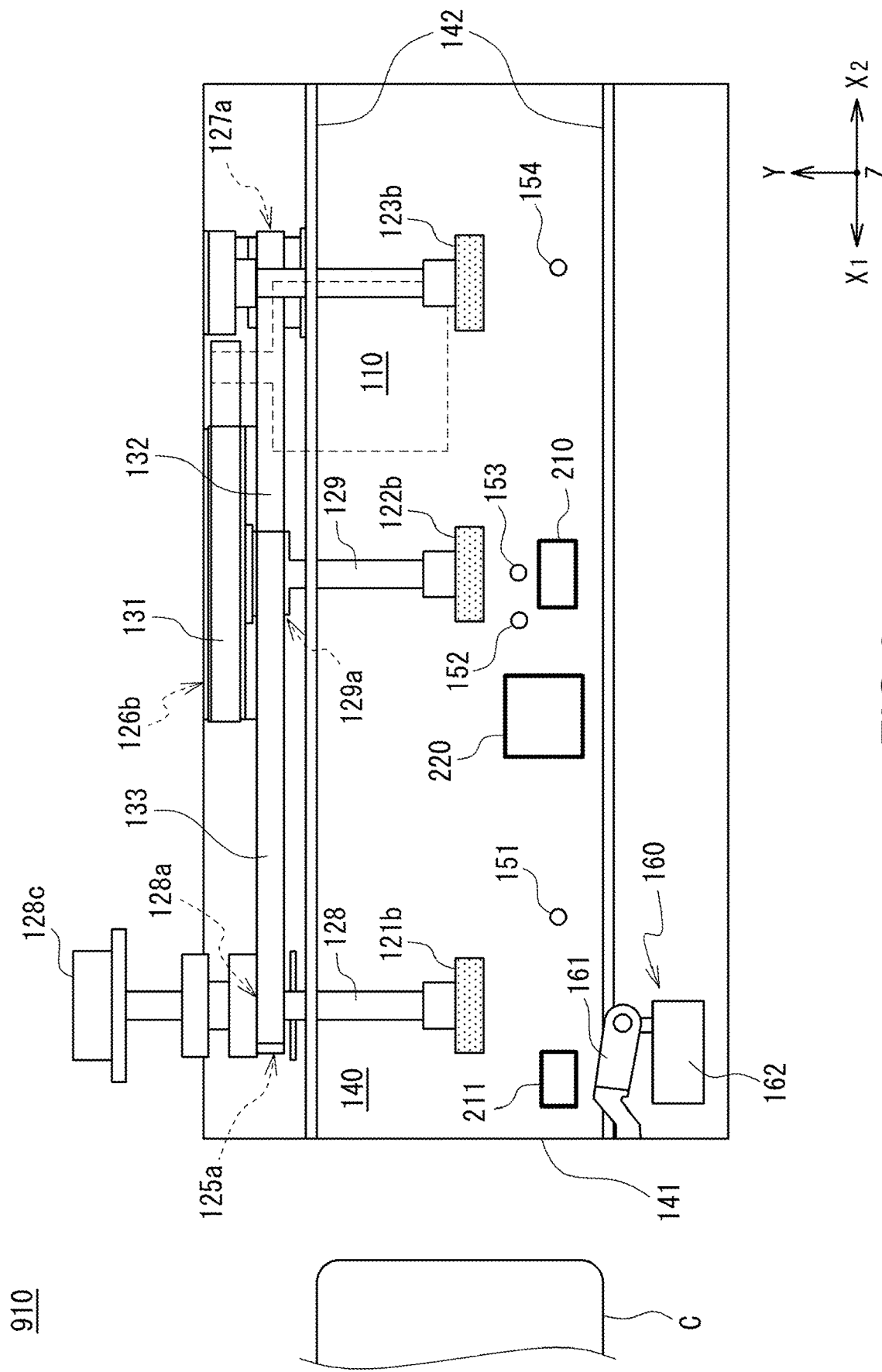
FIG. 3 is a cross-sectional plan view showing a card reader.

(Physical Structure) FIG. 2 and FIG. 3 are schematic views showing an internal mechanism of the card reader 910. FIG. 2 is a cross-sectional side view showing the card reader 910. FIG. 3 is a cross-sectional plan view showing the card reader 910. In the following descriptions, an "upper" and a "lower" mean an upper and lower direction which is the "Z"-axis of coordinate-axes indication in FIG. 2 and FIG. 3. Further, in the card reader 910, a "front" means the "X1" side of the coordinate-axes indication and a "rear" means the "X2" side, and a "width" means a dimension in the "Y"-axis direction of the coordinate-axes indication.

The conveyance passage 140 of the card reader 910 is extended in the front and rear direction of the card reader 910. A front face of the card reader 910 is provided with an insertion port 141 which is communicated with the conveyance passage 140. A passage width of the conveyance passage 140 is determined by a guide part 142 which are structured of a pair of side plates provided on both sides of the conveyance passage 140. The passage width of the conveyance passage 140 is substantially equal to a width of a card "C" and thus, an inclination of the card "C" in the width direction is prevented.

The conveyance rollers 120 are structured of a first roller 121, a second roller 122 and a third roller 123 which are successively disposed in the conveyance passage 140 from the front side to the rear side. The first roller 121 is structured of a drive roller 121a and a driven roller 121b, which are disposed just behind the insertion port 141. The second roller 122 is structured of a drive roller 122a and a driven roller 122b, which are disposed at a substantially center in the front and rear direction of the conveyance passage 140. The third roller 123 is structured of a drive roller 123a and a driven roller 123b, which are disposed on a slightly rear end side with respect to a center in a range from the second roller 122 to a rear end of the conveyance passage 140. In this specification, the "drive roller 120a" is a generic term of the drive rollers 121a, 122a and 123a, and the "driven roller 120b" is a generic term of the driven roller 121b, the driven roller 122b and the driven roller 123b.

A power transmission member which transmits a drive force of the motor 110 to the drive roller 120a includes toothed belts 131 and 132. First, an output of the motor 110 is transmitted to a large diameter gear part 126b which is a gear part provided in a shaft body 126 supporting the drive roller 122a through the toothed belt 131. The shaft body 126 is also provided with a small diameter gear part 126a which is a gear part having a diameter smaller than the large diameter gear part 126b, and the small diameter gear part 126a is rotated interlocking with rotation of the large diameter gear part 126b. A shaft body 125 supporting the drive roller 121a and a shaft body 127 supporting the drive roller 123a are also provided with gear parts 125a and 127a respectively. The small diameter gear part 126a of the shaft body 126 of the drive roller 122a and the gear parts 125a and 127a of the shaft bodies 125 and 127 of the drive roller 121a and the drive roller 123a are connected with each other through the toothed belt 132, and they are interlockingly rotated with each other. Tensioners 134 and 135 for the toothed belt 132 are disposed on a front side and a rear side of the drive roller 122a, and a constant tension is applied to the toothed belt 132 by the tensioners 134 and 135.

In this embodiment, a shaft body 128 supporting the driven roller 121b and a shaft body 129 supporting the driven roller 122b are also provided with gear parts 128a and 129a respectively and the gear parts 128a and 129a are connected with each other through a toothed belt 133. The shaft body 128 of the driven roller 121b is continuously connected with a manual rotation handle 128c provided on an outer side of a housing of the card reader 910. A power transmission mechanism structured of the manual rotation handle 128c and the driven rollers 121b and 122b is used when a card "C" is manually ejected from the card reader 910.

As described above, each of the drive rollers 121a, 122a and 123a of the conveyance mechanism 100 is driven by a single motor 110.

The photo sensor 150 and the lever switch 160 which are a detector for detecting that a card "C" has reached a predetermined position in the conveyance passage 140 is provided in the conveyance passage 140. The lever switch 160 is disposed in the insertion port 141. The photo sensor 150 is comprised of four photo sensors 151 through 154, and the photo sensor 151 is disposed near the first roller 121, the photo sensors 152 and 153 are disposed near the second roller 122, and the photo sensor 154 is disposed near the third roller 123 respectively.

The lever switch 160 includes a lever part 161 and a switch part 162, and an ON/OFF state of the switch part 162 is mechanically switched by an operation of the lever part 161. A part of the lever part 161 is projected to an inside of the conveyance passage 140 and, when a card "C" is inserted into the insertion port 141, the lever part 161 is pushed to an outer side from the conveyance passage 140 by the card "C". As a result, a state of the switch part 162 is switched to "ON" and existence of the card "C" is detected.

The photo sensor 150 is an optical type sensor comprised of a combination of light emitting diodes which are light emitting elements not shown and the photo sensors 151 through 154 which are light receiving elements and, when an emission light of the light emitting diode is blocked by a card "C", arrival of the card "C" is detected. In this embodiment, a detector which is capable of using as the conveyance-state specifying means "D" is not limited to the photo sensor 150 and, for example, a magnetic sensor and an ultrasonic sensor may be used. However, it is necessary to be careful about constraints that a magnetic sensor is easily affected by a magnetic environment within the device and an ultrasonic sensor is easily affected by temperature and humidity.

Further, the magnetic head 210 and the IC contact block 220 which are the information processing part 200 are provided within the conveyance passage 140. The magnetic head 210 is disposed on an under face side of the conveyance passage 140 and contacts with a magnetic stripe of a card "C" from a lower side. The IC contact block 220 is disposed on an upper face side of the conveyance passage and contacts with an IC chip terminal of the card "C" from an upper side. Further, the insertion port 141 is disposed with a pre-head 211 which is a magnetic head structured to discriminate whether a card "C" is a proper card or an illegal card based on magnetic information of the card "C". In this embodiment, existence of a card "C" can be also identified by the information processing part 200 and the pre-head 211 and thus, they can be used as a part of the conveyance state identifying means "D".

For the card "C" whose existence has been confirmed by the lever switch 160, magnetic data are checked by the pre-head 211 and, only when it is determined that the card is a proper card, a shutter not shown provided in the insertion port 141 is opened. As a result, the motor 110, i.e., the conveyance mechanism 100 is started, a card "C" is taken into the conveyance passage 140 by the conveyance roller 120, and the information processing part 200 performs reading of information recorded in the card "C" or writing of information to the card "C". During this time, a conveyance state "S" of the card "C" is monitored by the conveyance state identifying means "D". Further, in this case, the conveyance roller 120 conveys the card "C" at a constant speed at which processing in the information processing part 200 can be performed. After completion of reading or writing of information, the card "C" is ejected through the insertion port 141 by the conveyance roller 120.

In this embodiment, the card reader 910 includes various kinds of mechanical components and electric components not shown in addition to the above-mentioned physical structures.

[Protection Function]

A protection function of a card "C" and the conveyance mechanism 100 in the conveyance mechanism 100 will be described below.

(Conveyance State Identifying Function) FIG. 4(a)through 4(f) are views for explaining a method in which a conveyance state "S" of a card "C" is identified in a protection function for the conveyance mechanism 100. In this embodiment, a conveyance state "S" of a card "C" is identified by monitoring output values of the lever switch 160 and the photo sensors 151 through 154 with the control program 132a. In this case, as described above, the "conveyance state "S"" in this embodiment means a position and a conveyance direction of a card "C" in the conveyance passage 140.

A "conveyance direction" of a card "C" includes two kinds of a "forward direction" and a "reverse direction". The "forward direction" is a direction that a card "C" is taken into the conveyance passage 140 through the insertion port 141. The "reverse direction" is a direction that a card "C" in the conveyance passage 140 is ejected through the insertion port 141. FIG. 4(a)through 4(f) show an example of the "forward direction". Determination of a "forward direction" and a "reverse direction" can be identified based on a rotating direction of the motor 110 which is rotated by the control program 132a. Further, a "forward direction" and a "reverse direction" may be previously determined depending on kinds of conveyance processing to be executed (for example, taking-into processing or ejecting processing of a card "C").

Further, in this embodiment, a "position" of a card "C" is distinguished based on a relative position between the card "C" and the respective conveyance rollers 120. More specifically, types of "positions" of a card "C" in this embodiment are distinguished into a position of the first roller 121, a position of the second roller 122 and a position of the third roller 123 depending on a range where each conveyance roller 120 becomes a conveying main body for the card "C".

When a card "C" is inserted into the insertion port 141, the lever switch 160 is switched to an "ON" state by the card "C" and thereby existence of the card "C" is detected. Further, when it is confirmed that the card "C" is proper by the pre-head 211 disposed in the insertion port 141, the shutter not shown is opened and taking of the card "C" into the conveyance passage 140 is started. In this state, the card "C" is located at a position of the first roller 121 (FIG. 4(a)).

As the card "C" is taken into the conveyance passage 140 by the first roller 121, the photo sensor 151 disposed in the vicinity of the first roller 121 detects arrival of the card "C". Also at this time, the card "C" is located at the position of the first roller 121 (FIG. 4(b)).

Figure 4A:
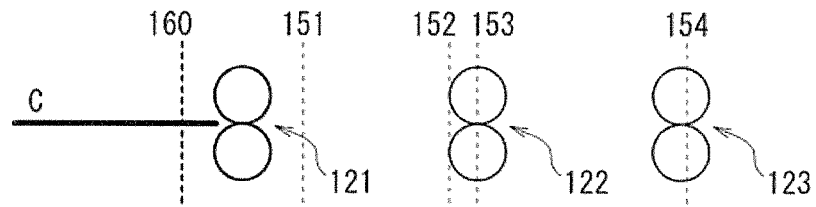
FIG. 4(a) through 4(f) are views for explaining a method in which a conveyance state of a card is identified.
Figure 4B:
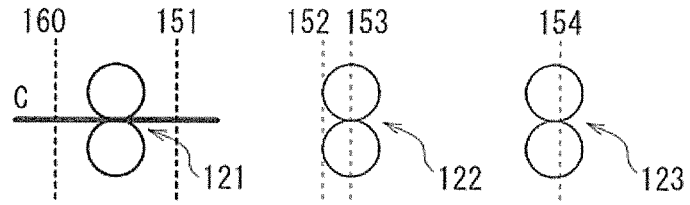
Figure 4C:
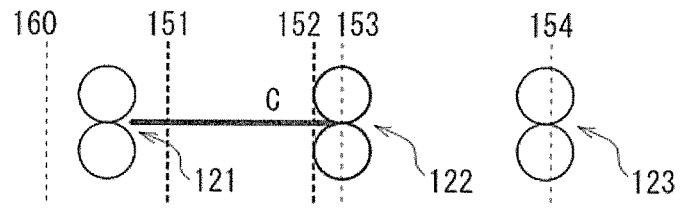
Figure 4D:
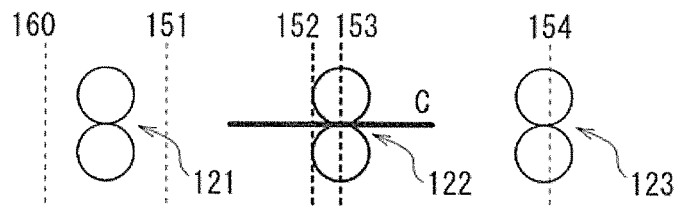
Figure 4E:
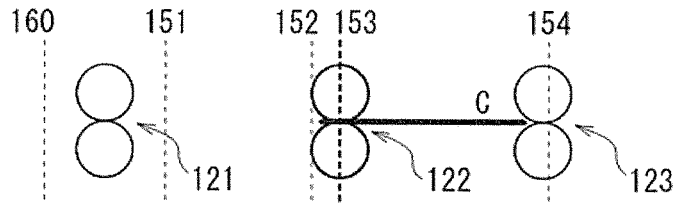

When the card "C" has reached the photo sensor 152 disposed in the vicinity of the second roller 122, it is determined that a conveying main body for the card "C" is switched from the first roller 121 to the second roller 122 (FIG. 4(c)). Then, the card "C" is sent toward the third roller 123 with the second roller 122 as a conveying main body (FIGS. 4(d) and 4(e)).

Figure 4F:
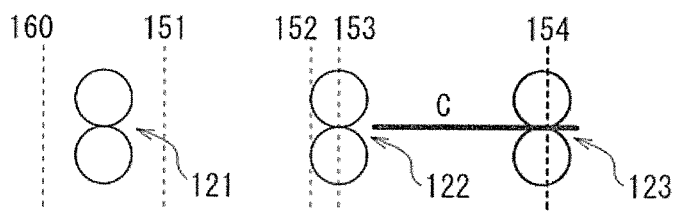

After that, when the photo sensor 154 detects arrival of the card "C" and the card "C" is left from the photo sensor 153, it is determined that the conveying main body for the card "C" is switched from the second roller 122 to the third roller 123 (FIG. 4(f)).

As an identifying method for a conveyance state "S" of a card "C", in addition to the above-mentioned method, for example, it may be possible to estimate a change of the conveyance state "S" by counting a rotation number of the motor 110 or by measuring a time after the card "C" is inserted. On the other hand, in this embodiment, the lever switch 160 and the photo sensors 151 through 154 are disposed in the conveyance passage 140 and thus, an actual conveyance state "S" of a card "C" can be fed back to the control device 130. Therefore, a conveyance state "S" of a card "C" can be identified with a further high degree of accuracy.

In this embodiment, a position of a card "C" is distinguished by a relative position to the respective conveyance rollers 120. However, a type of position of a card "C" may be distinguished with a point where an upper limit value of an output torque allowable for the motor 110 is changed as a boundary, and it is not always linked with a position of the conveyance roller 120.

(Upper Limit Torque Switching Function)

In a case that a conveyance member which is directly contacted with a card "C" to apply a force like the conveyance roller 120 is adopted, when a conveyance abnormality such as clogging of a card "C" has occurred, the card "C" may be damaged by a force of the conveyance roller 120 applied to the card "C". Especially, the conveyance roller 120 in this embodiment is a mechanism structured to send a card "C" out by a frictional force and thus, when slip has occurred, a scratch may be left on a surface of the card "C". In addition, the conveyance mechanism 100 in this embodiment includes the toothed belts 131 and 132 as the power transmission member of the motor 110. Therefore, when synchronization of the respective power transmission members is impaired due to a conveyance abnormality, tensions of the toothed belts 131 and 132 are disturbed, tooth skipping may occur between the toothed belts 131 and 132 and the engagement members. Hereinafter, an operation like the slip and the tooth skipping which may occur due to a conveyance abnormality of a card "C" to cause damage of the card "C" and the conveyance mechanism 100 is referred to as a "damage operation". Naturally, the damage operation is not limited to the slip and the tooth skipping, and other damage operations may occur due to a mechanical feature of the conveyance mechanism.

Due to the above-mentioned concern, an upper limit value is required to be set to an output torque of the motor 110 so as to be capable of avoiding a damage operation even in a case that a conveyance abnormality of a card "C" has occurred. However, a torque generated by a damage operation becomes different depending on a conveyance state "S" of a card "C" and thus, in a case that a single upper limit value is set for the entire mechanism, the upper limit value is required to be set to the minimum value of upper limit values of output torques (hereinafter, simply referred to as an "upper limit torque") allowable for respective conveyance states "S". In this case, even when a motor having a high output is adopted in order to increase the processing speed, a part of the effectiveness may be wasted.

On the other hand, the upper limit torque table 132b provided in the control device 130 in this embodiment is registered with upper limit torque information "L" which is upper limit torques of the motor 110 for each type of the conveyance states "S" of a card "C". As a result, the control device 130 is capable of dynamically switching an upper limit torque corresponding to a conveyance state "S" of a card "C". The following are actual registration contents of the upper limit torque table 132b in this embodiment. The upper limit torque information "L" in this embodiment directly indicates upper limit torques. However, the upper limit torque information "L" may be a parameter value for calculating an upper limit torque.

TABLE 1

|  |  | Card Position (Conveying Main Body) | | |
| --- | --- | --- | --- | --- |
|  |  | First Roller | Second Roller | Third Roller |
| Conveyance Direction | Forward Direction | 12 [mN · m] | 33 [mN · m] | 27 [mN · m] |
|  | Reverse Direction | 17 [mN · m] | 33 [mN · m] | 15 [mN · m] |

In this embodiment, when having exceeded respective upper limit torques at the time of conveyance to the forward direction, tooth skipping occurs at a position of the first roller 121, slip occurs at a position of the second roller 122, and slip occurs at a position of the third roller 123. When having exceeded respective upper limit torques at the time of conveyance to the reverse direction, slip occurs at the position of the first roller 121, slip occurs at the position of the second roller 122, and tooth skipping occurs at the position of the third roller 123. This depends on a structural feature of the conveyance mechanism 100 and damage operations and upper limit torques of other conveyance mechanisms may be different. For example, upper limit torques are different from the values in Table 1 when power transmission members of a motor are structured of only gears and do not include a toothed belt and a pulley, when a number and arrangement of conveyance rollers are different and, when a conveyance member other than a conveyance roller is used. Therefore, the upper limit torque information "L" is required to be set by acquiring an actually measured value for each model of a conveyance mechanism.

Further, for example, like the upper limit torque at the position of the second roller 122 in Table 1, it may happen that upper limit torques are not changed in the forward direction and the reverse direction. For example, when upper limit torques are the same as each other in the forward direction and the reverse direction in all types of position ranges, the upper limit torque can be set merely based on a position of a conveyance object. Further, in this embodiment, the control device 130 of the card reader 910 includes the upper limit torque table 132a, but the upper limit torque table 132a may be disposed in the host apparatus 900. In addition, the entire control device 130 may be disposed in the host apparatus 900.

Figure 5:
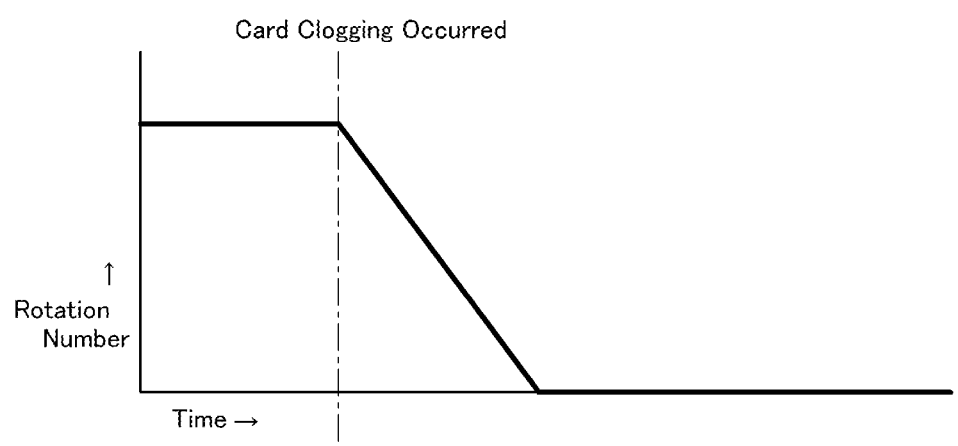
FIG. 5 is a view for explaining a method in which an output torque of a motor is suppressed to a predetermined upper limit value or less.
Figure 5:
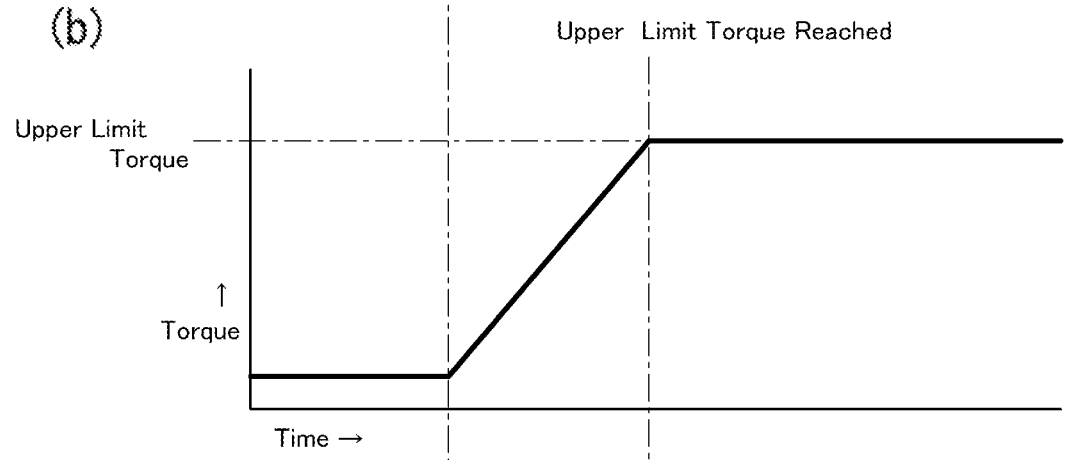
Figure 5:
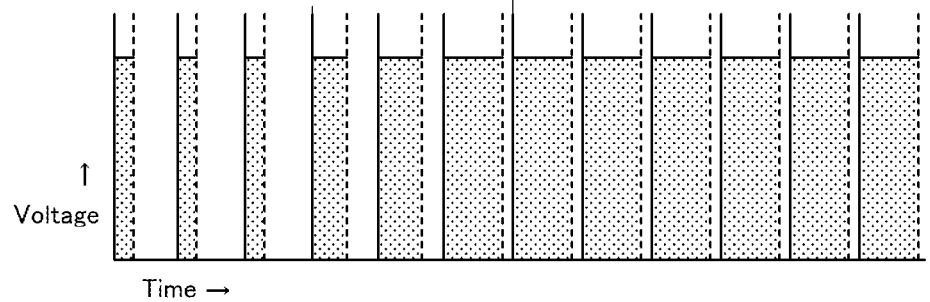

(Torque Limiting Function) FIG. 5 is a view for explaining a method in which an output torque of the motor 110 is suppressed to a predetermined upper limit value or less. FIG. 5 shows an operation of the conveyance mechanism 100 when clogging of a card has occurred. (a) of FIG.5 is a graph indicating a temporal change of a rotation number of the motor 110. (b) of FIG.5 is a graph indicating a temporal change of an output torque of the motor 110. FIG. 5(c) is a graph indicating a temporal change of a duty ratio of a voltage applied to the motor 110.

As also described above, in the control device 130 in this embodiment, a rotation number of the motor 110 can be acquired from the encoder 111 of the motor 110, and a voltage value of the motor 110 can be acquired from the drive circuit 115. As a result, the control program 132a of the control device 130 is capable of calculating an output torque of the motor 110 at that time based on the rotation number, the voltage value and the motor characteristic coefficient 132c of the motor 110.

Further, the motor 110 in this embodiment is a DC motor and the control program 132a controls a voltage applied to the motor 110 by a pulse-width modulation system. Therefore, the control program 132a is capable of controlling an output torque of the motor 110 by adjusting a duty ratio of the voltage applied to the motor 110. In addition, the control program 132a is capable of dynamically switching an upper limit torque of the motor 110 by acquiring an upper limit torque corresponding to a conveyance state "S" of a card "C" from the upper limit torque table 132b.

As shown in FIG. 5, when clogging of a card has occurred, a rotation number of the motor 110 is decreased by the resistance force. The control program 132a and the drive circuit 115 attempt to keep the rotation number of the motor 110 constant by PID control (alternatively, PI control or the like) and thus, they act so as to increase the rotation number of the motor 110. In other words, a voltage applied to the motor 110 is increased. On the other hand, as the rotation number of the motor 110 decreases due to the clogging of the card, an output torque of the motor 110 rises suddenly together with an increase of the applied voltage. In this embodiment, when the output torque of the motor 110 has reached an upper limit value in that case, the control program 132a suppresses the voltage applied to the motor 110 (in this case, duty ratio) so as to suppress the output torque to the upper limit value or less.

In this case, a control method for an output torque of the motor 110 is not limited to a method in which a duty ratio is operated. For example, a voltage applied to the motor 110 may be controlled by using a power amplifier or the like, or controlled by static Leonard system, in other words, the control method can be substituted which is capable of setting an upper limit value for each conveyance state "S" of a card "C" by using a variable parameter controlling an output torque of the motor 110.

As described above, in the conveyance mechanism 100 in this embodiment, even when a conveyance abnormality of a card "C" has occurred, operation of the conveyance roller 120, i.e., operation of a power transmission member can be stopped before a damage operation is performed. As a result, the conveyance mechanism 100 can be attained to surely transmit a conveyance force to a card "C" by the conveyance roller 120 and also to protect the conveyance mechanism 100 and a card "C" without limiting an upper limit torque to the minimum value in the entire mechanism. Further, mechanical restriction of the toothed belts 131 and 132 in which tension is required to keep constant is also coped with.

In order to set an upper limit torque corresponding to a conveyance state "S" of a card "C", for example, in a case that a torque limiter mechanism is provided in each drive roller 120a and an upper limit torque is individually set for each drive roller 120a, there are concerns that the number of components is increased, the mechanism becomes complicated according to the increase of the number of components, and assembling steps and a manufacturing cost are increased. On the other hand, the conveyance mechanism 100 in this embodiment is structured so that the control device 130 switches an upper limit torque of the motor 110 corresponding to the conveyance state "S" and thus, the conveyance mechanism 100 has no above-mentioned disadvantage.

Further, in order to set an upper limit torque corresponding to a conveyance state "S" of a card "C", for example, in a case that a dedicated motor is provided in each drive roller 120a, there are concerns that a size of the mechanism is increased according to the increase of the number of the motors, and power consumption, assembling steps and a manufacturing cost are increased. On the other hand, in the conveyance mechanism 100 in this embodiment, an upper limit torque of the motor 110 can be dynamically switched and thus, a plurality of the conveyance rollers 120 can be controlled by one motor. As a result, minute control of an upper limit torque corresponding to a conveyance state "S" is achieved while suppressing the number of the motors being mounted.

In addition, for example, in a case that an output torque of the motor is switched by a current limiting circuit, a plurality of limiting circuits and a switching circuit for them are required and thus, there is a concern that a manufacturing cost is increased. On the other hand, in the conveyance mechanism 100 in this embodiment, a voltage applied to the motor 110 is controlled to adjust an output torque and thus, control by a program can be performed and the conveyance mechanism 100 has no above-mentioned disadvantage. Further, in a DC motor used in a general conveyance mechanism, it is conceivable that a rotation number is commonly controlled by a pulse-width modulation system. Therefore, a method is adopted that a duty ratio of a voltage applied to a DC motor is controlled to control an output torque of the motor and thereby, a protection function in the present invention can be efficiently mounted by utilizing an existing conveyance mechanism.

(Processing Flow of Protection Function)

Figure 6:
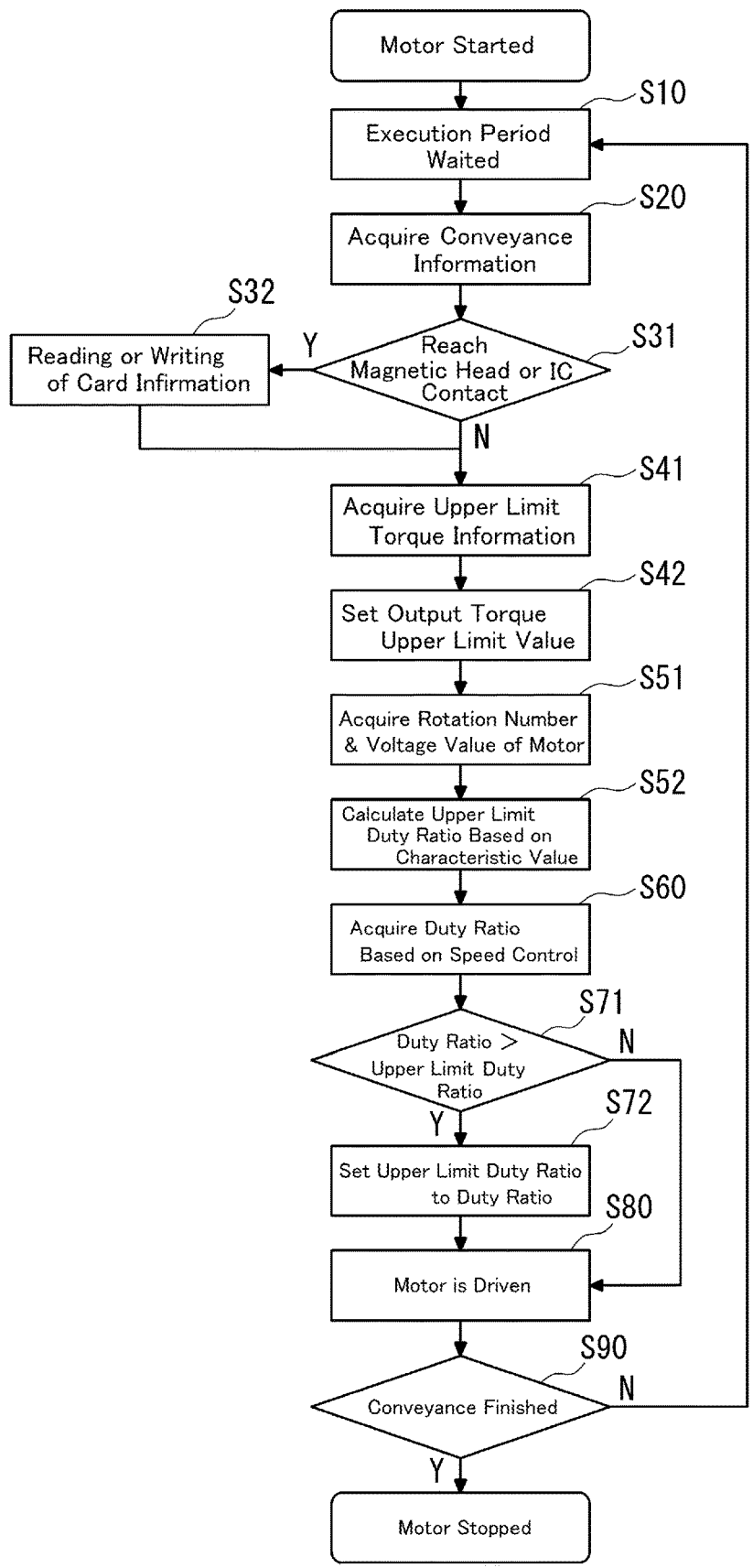
FIG. 6 is a flow chart showing a temporal processing flow of a protection function provided in a conveyance mechanism.

FIG. 6 is a flow chart showing a processing flow of a protection function provided in the conveyance mechanism 100.

Protection processing for the conveyance mechanism 100 is executed for each input of an encoder pulse or each constant time period after the conveyance mechanism 100 is started (motor 110 is started) (S10).

When the processing is started, the control program 132a checks output values of the lever switch 160 and the photo sensors 151 through 154 and a current conveyance state "S" of a card "C" is acquired (S20: conveyance state identifying step). In this case, a series of processing (hereinafter, also referred to as a "routine") shown in FIG. 6 shows processing contents in a forward direction and, in a reverse direction, processing contents in which an information processing step described below is omitted are performed.

At this time, in a case that the magnetic head 210 is contacted with a magnetic stripe of a card "C" or that the IC contact block 220 is contacted with a terminal of an IC chip (S31: Y), the control program 132a performs reading of information recorded in the card "C" or writing of information to the card "C" (S32: information processing step).

On the other hand, when the card "C" is not existed at a position where the information processing part 200 is capable of processing (S31: N), the control program 132a acquires an upper limit torque corresponding to a conveyance state "S" of the card "C" from the upper limit torque table 132b (S41: upper limit torque information acquisition step) and holds it as an upper limit torque in the current routine (S42: upper limit torque setting step).

After that, the control program 132a acquires the rotation number of the motor 110 from the encoder 111 of the motor 110 and acquires a voltage value of the motor 110 from the drive circuit 115 (S51). In addition, the control program 132a calculates a duty ratio which is the upper limit in the current routine based on the characteristic coefficient 132c of the motor 110 (S52: upper limit voltage calculation step).

Next, the control program 132a inspects a duty ratio which is set by PID control of the motor 110 (S60). In a case that the duty ratio based on the PID control has exceeded the upper limit duty ratio (S71: Y), the upper limit duty ratio is set to a duty ratio of a voltage applied to the motor 110 in the current routine (S72: torque adjustment step) and the motor 110 is driven (S80).

On the other hand, the duty ratio based on the PID control does not exceed the upper limit duty ratio (S71: N), the motor 110 is driven at the duty ratio based on the PID control (S80).

When conveyance of the card "C" has been completed (S90: Y), the motor 110 is stopped to finish the operation of the conveyance mechanism 100. On the other hand, when the conveyance of the card "C" is not completed (S90: N), the processing is advanced to waiting of the next execution period (S10).

Although the present invention has been shown and described with reference to a specific embodiment, various changes and modifications will be apparent to those skilled in the art from the teachings herein. For example, a conveyance object in the present invention is not limited to a card. Further, an application of the conveyance mechanism in the present invention is not limited to a card reader, and the conveyance mechanism may be also applied to a paper feed mechanism such as a facsimile and a printer.

141 insertion port
"D" conveyance state identifying means
151-154 (150) photo sensor (detector)
160 switch lever (detector)
170 power supply circuit
190 external I/F
200 information processing part
210 magnetic head
220 IC contact block
"C" card (conveyance object (information recording medium))

What is claimed is:

1. A conveyance mechanism comprising:
a conveyance passage which is a passage where a conveyance object is conveyed;
a conveyance member which moves the conveyance object along the conveyance passage;
a motor which drives the conveyance member;
a control part which controls an output torque of the motor;
a conveyance state identifying means which identifies a conveyance state that is a position and/or a conveyance direction of the conveyance object in the conveyance passage; and
a storage part in which upper limit torque information which is an upper limit value of an output torque allowable for the motor or a parameter value required for calculation of the upper limit value is registered for each type of the conveyance state;
wherein the control part acquires the upper limit torque information corresponding to the conveyance state from the storage part based on the conveyance state identified by the conveyance state identifying means and dynamically switches the upper limit value of the output torque allowable for the motor.

2. The conveyance mechanism according to claim 1, wherein
the control part is capable of estimating an output torque of the motor from a rotation number and a voltage value of the motor based on a torque characteristic of the motor, and
the control part adjusts a voltage applied to the motor so as not to exceed the upper limit value of the output torque allowable for the motor.

3. The conveyance mechanism according to claim 2, wherein
the motor is a DC motor,
the control part controls the voltage applied to the motor by a pulse-width modulation system, and
the control part adjusts a duty ratio of the voltage applied to the motor so as not to exceed the upper limit value of the output torque allowable for the motor.

4. The conveyance mechanism according to claim 3, wherein
the conveyance state identifying means comprises a detector structured to detect that the conveyance object has reached a predetermined position on the conveyance passage, and
the detector is disposed at a plurality of positions on the conveyance passage.

5. The conveyance mechanism according to claim 4, wherein
the conveyance member comprises conveyance rollers which are a pair of rotation bodies structured to sandwich and send out the conveyance object, and
the conveyance rollers are structured of a drive roller which is rotated by a drive force of the motor and a driven roller which is rotated following rotation of the drive roller or sliding of the conveyance object.

6. The conveyance mechanism according to claim 5, wherein
the conveyance member comprises a plurality of sets of the conveyance rollers, and
a plurality of the drive rollers is driven by one piece of the motor.

7. The conveyance mechanism according to claim 6, further comprising a power transmission member structured to transmit the drive force of the motor to the drive roller, wherein the power transmission member comprises a toothed belt.

8. The conveyance mechanism according to claim 1, wherein
the conveyance state identifying means comprises a detector structured to detect that the conveyance object has reached a predetermined position on the conveyance passage, and
the detector is disposed at a plurality of positions on the conveyance passage.

9. The conveyance mechanism according to claim 1, wherein
the conveyance member comprises conveyance rollers which are a pair of rotation bodies structured to sandwich and send out the conveyance object, and
the conveyance rollers are structured of a drive roller which is rotated by a drive force of the motor and a driven roller which is rotated following rotation of the drive roller or sliding of the conveyance object.

10. The conveyance mechanism according to claim 9, wherein
the conveyance member comprises a plurality of sets of the conveyance rollers, and a plurality of the drive rollers is driven by one piece of the motor.

11. The conveyance mechanism according to claim 9, further comprising a power transmission member structured to transmit the drive force of the motor to the drive roller, wherein the power transmission member comprises a toothed belt.

12. A medium processing device comprising a conveyance mechanism, the conveyance mechanism comprising:
a conveyance passage which is a passage where a conveyance object is conveyed;
a conveyance member which moves the conveyance object along the conveyance passage;
a motor which drives the conveyance member;
a control part which controls an output torque of the motor;
a conveyance state identifying means which identifies a conveyance state that is a position and/or a conveyance direction of the conveyance object in the conveyance passage; and
a storage part in which upper limit torque information which is an upper limit value of an output torque allowable for the motor or a parameter value required for calculation of the upper limit value is registered for each type of the conveyance state;
wherein the control part acquires the upper limit torque information corresponding to the conveyance state from the storage part based on the conveyance state identified by the conveyance state identifying means and dynamically switches the upper limit value of the output torque allowable for the motor; wherein the conveyance object is a card-shaped information recording medium, and wherein the medium processing device further comprises an information processing part which is capable of executing at least one of reading processing of information recorded in the information recording medium and writing processing of information to the information recording medium.

13. The medium processing device according to claim 12, wherein the conveyance member moves the conveyance object at a constant speed.

14. A conveyance method by use of a conveyance mechanism, the conveyance mechanism comprising:
a conveyance passage which is a passage where a conveyance object is conveyed;
a conveyance member which moves the conveyance object along the conveyance passage;
a motor which drives the conveyance member;
a conveyance state identifying means which identifies a conveyance state that is a position and/or a conveyance direction of the conveyance object in the conveyance passage; and
a storage part in which upper limit torque information which is an upper limit value of an output torque allowable for the motor or a parameter value required for calculation of the upper limit value is registered for each type of the conveyance state;
the conveyance method comprising:
a conveyance state identifying step in which the conveyance state of the conveyance object is identified by the conveyance state identifying means;
an upper limit torque information acquisition step in which the upper limit torque information corresponding to the conveyance state is acquired from the storage part; and
an upper limit torque setting step in which the upper limit value of the output torque allowable for the motor is switched based on the upper limit torque information corresponding to the conveyance state.

15. The conveyance method according to claim 14, further comprising:
an upper limit voltage calculation step in which an upper limit voltage capable of being applied to the motor is calculated from a rotation number of the motor based on a torque characteristic of the motor; and
a torque adjustment step in which the voltage applied to the motor is adjusted so as not to exceed the upper limit value of the output torque.

16. The conveyance method according to claim 15, wherein
the motor is a DC motor in which an applied voltage is controlled by a pulse-width modulation system, and
a duty ratio of the applied voltage to the motor is adjusted in the torque adjustment step so as not to exceed the upper limit value of the output torque.

17. The conveyance method according to claim 16, wherein
the conveyance member comprises a plurality of sets of conveyance rollers which are a pair of rotation bodies structured to sandwich and send out the conveyance object,
each set of the conveyance rollers is structured of a drive roller which is rotated by a drive force of the motor and a driven roller which is rotated following rotation of the drive roller or sliding of the conveyance object, and
a plurality of the drive rollers is driven by one piece of the motor.

18. The conveyance method according to claim 14, wherein
the conveyance member comprises a plurality of sets of conveyance rollers which are a pair of rotation bodies structured to sandwich and send out the conveyance object,
each set of the conveyance rollers is structured of a drive roller which is rotated by a drive force of the motor and a driven roller which is rotated following rotation of the drive roller or sliding of the conveyance object, and
a plurality of the drive rollers is driven by one piece of the motor.

19. The conveyance method according to claim 18, wherein
the conveyance mechanism further comprises a power transmission member structured to transmit the drive force of the motor to the drive roller, and
the power transmission member comprises a toothed belt.

20. The conveyance method according to claim 14, wherein
the conveyance object is a card-shaped information recording medium, and
the conveyance method further comprises an information processing step in which at least one of reading processing of information recorded in the information recording medium and writing processing of information to the information recording medium is executed.

* * * * *